United States Patent [19]

Hori

[11] Patent Number: 5,186,533
[45] Date of Patent: Feb. 16, 1993

[54] LAMP ARRANGEMENT FOR MOTOR VEHICLE

[75] Inventor: Masayuki Hori, Kanagawa, Japan

[73] Assignee: Nissan Motor Co., Ltd., Yokohama, Japan

[21] Appl. No.: 866,966

[22] Filed: Apr. 10, 1992

Related U.S. Application Data

[63] Continuation of Ser. No. 646,541, Jan. 28, 1991, abandoned.

[30] Foreign Application Priority Data

Jan. 30, 1990 [JP] Japan .................................. 2-20242

[51] Int. Cl.$^5$ ............................................. B60Q 1/26
[52] U.S. Cl. ................................. 362/80.1; 340/479; 359/13; 359/22; 359/25
[58] Field of Search ...................... 362/80.1; 340/479; 359/13, 22, 25, 630, 15

[56] References Cited

U.S. PATENT DOCUMENTS

| | | | |
|---|---|---|---|
| 3,405,614 | 10/1968 | Lin et al. | 350/3.73 |
| 4,036,552 | 7/1977 | Lee et al. | 350/3.73 |
| 4,824,193 | 4/1989 | Maeda et al. | 359/15 |
| 4,892,369 | 1/1990 | Moss | 340/479 |
| 4,916,593 | 4/1990 | Moss et al. | 362/80.1 |
| 4,935,722 | 6/1990 | Pollack | 362/80.1 |
| 4,966,426 | 10/1990 | Moss et al. | 362/80.1 |
| 5,112,121 | 5/1992 | Chang et al. | 359/15 |

Primary Examiner—Carroll B. Dority
Attorney, Agent, or Firm—Lowe, Price, LeBlanc & Becker

[57] ABSTRACT

A lamp arrangement for a motor vehicle comprises a light source including a plurality of bulbs and arranged in a rear shelf panel, and a transmission hologram mounted on a rear window on the cabin side thereof. The transmission hologram includes a plurality of divisions which have different diffraction characteristics from each other. Almost all incident lights from the light source are diffracted by any of the divisions rearward of the vehicle.

5 Claims, 9 Drawing Sheets

LAMP ARRANGEMENT FOR MOTOR VEHICLE

This application is a continuation of application Ser. No. 07/646,541 filed Jan. 28, 1991 and now abandoned.

BACKGROUND OF THE INVENTION

The present invention relates to a lamp arrangement for a motor vehicle and, more particularly, to same using a hologram.

Figure 8:
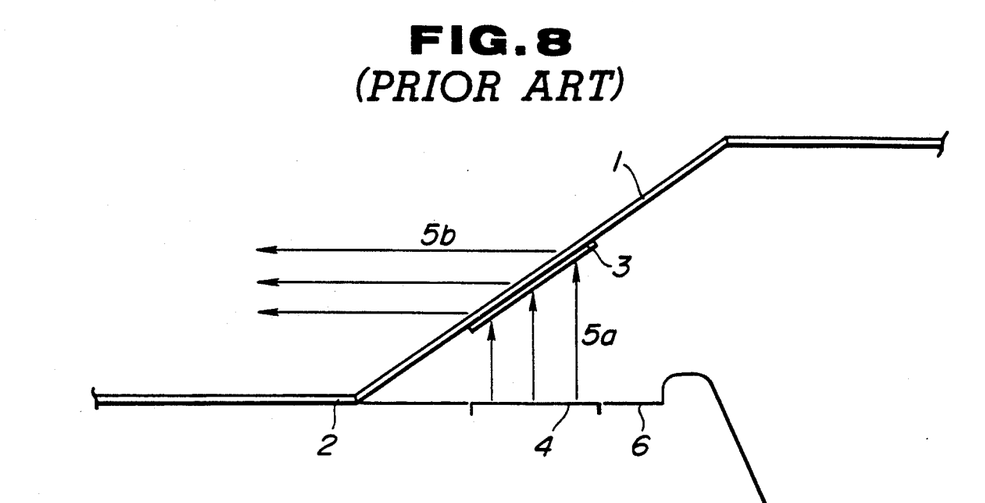
FIG. 8 is a schematic view illustrating a known lamp arrangement for a motor vehicle.
Figure 9:
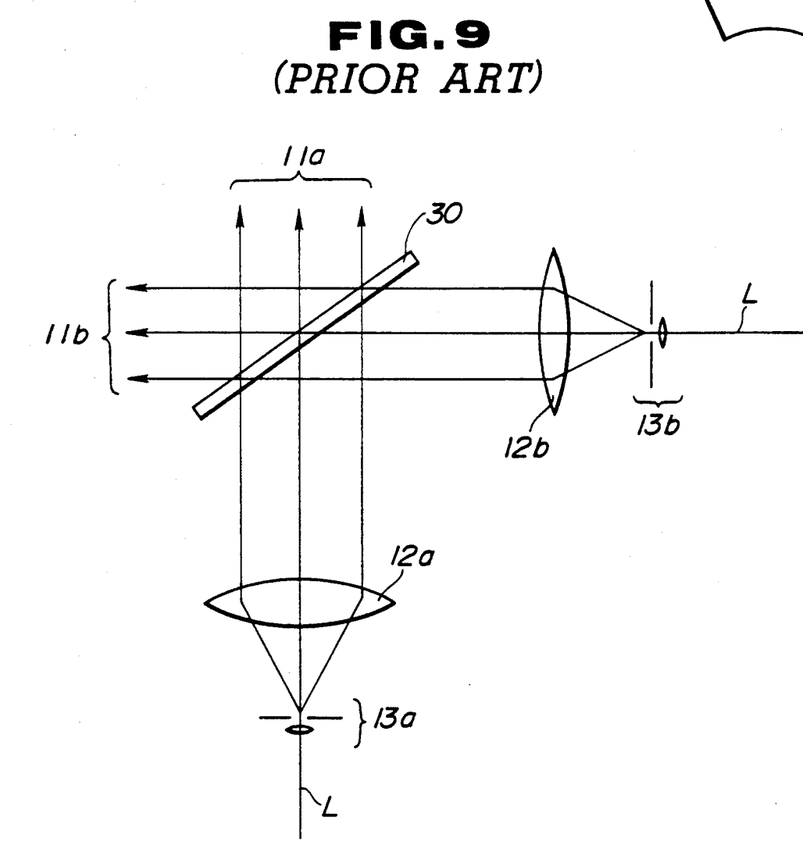
FIG. 9 is a view similar to FIG. 3a, illustrating a known exposure system of the hologram.

A lamp arrangement for a motor vehicle is disclosed, for example, in JP-U 2-74243. Referring to FIGS. 8 and 9, a description will be made with regard to such lamp arrangement for a motor vehicle. This lamp arrangement serves as a high mounted stop lamp to be lighted when a brake switch is turned on.

Referring to FIG. 8, the lamp arrangement is arranged in a cabin of a motor vehicle 2 at a rear portion thereof, and includes a transmission hologram 3 which is mounted on a rear window 1 on the cabin side thereof, and a light source 4 which is built in a rear shelf panel 6 located at the rear of a rear seat. Lights 5a as emerged from the light source 4 are diffracted by the hologram 3 rearward of the vehicle 2, thus obtaining diffracted lights 5b. In that manner, the lamp arrangement functions as a high mounted stop lamp.

It is well known that the transmission hologram 3 is formed by recording interference fringes of a coherent laser light, and that a condition of diffraction of the hologram 3 upon mounting depends on an incidence angle of the laser light upon exposure.

Referring to FIG. 9, there is shown an exposure system used in JP-U 2-74243. In FIG. 9, reference numerals 13a and 13b designate spatial filters arranged for diverging a laser beam L, and 12a and 12b designate collimating lenses arranged for making the laser beam L diverged by the spatial filters 13a and 13b two parallel beams 11a and 11b, respectively. By exposing a unexposed hologram 30 to the two parallel laser beams 11a and 11b, the interference fringes are recorded in the unexposed hologram 30 so as to diffract the incident lights 5a from the light source 4 in a direction with a predetermined angle of diffraction. It is to be noted that the parallel laser beam 11a corresponds to the incident lights 5a from the light source 4 upon mounting, and that the parallel laser beam 11b corresponds to the lights 5b diffracted in a predetermined direction by the hologram 3 upon mounting. Thus, upon mounting, the hologram 3 diffracts the incident lights 5a from the light source 4 in the direction with a predetermined angle of diffraction, obtaining the diffracted lights 5b.

Figure 10A:
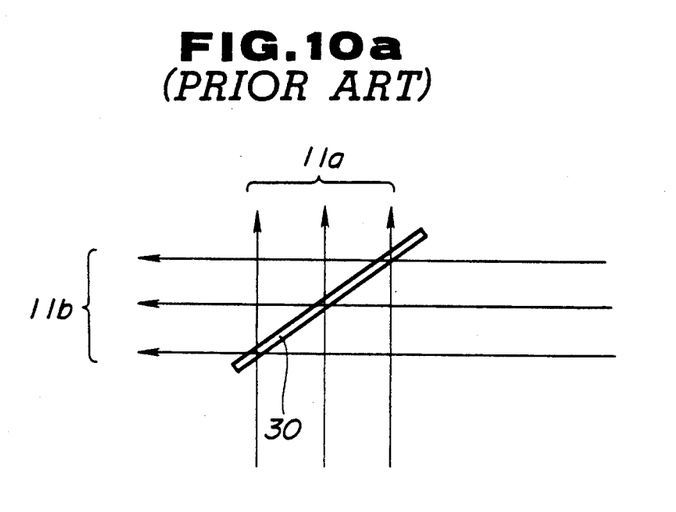
FIG. 10a is a fragmentary view of FIG. 9.
Figure 10B:
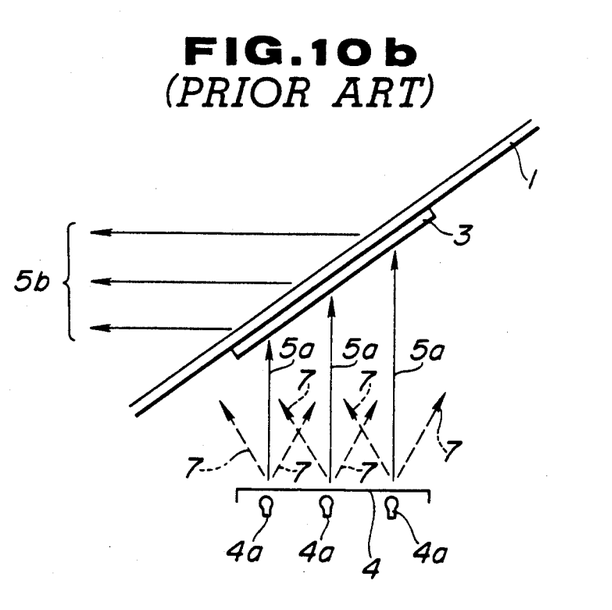
FIG. 10b is a view similar to FIG. 5, illustrating the operation upon mounting without a lens system of collimating lens.

Referring to FIG. 10a, there is shown a fragmentary view of the known exposure system as shown in FIG. 9. As shown in FIG. 10a, the unexposed hologram 30 is exposed to the two parallel laser beams 11a and 11b. Accordingly, also upon mounting, the hologram 3 needs to receive the parallel incident lights 5a from the light source 4 as shown in FIG. 10b. Thus, in that event, a plurality of bulbs 4a constitute the light source 4 so as to emit the parallel lights.

In that event, for obtaining the parallel lights out of the plurality of bulbs 4a, a lens system of collimating lens and the like (not shown) should be arranged to each bulb 4a. This results in an inconvenience that the light source 4 is enlarged in size.

The lens system may be eliminated. Without the lens system, however, there arises another inconvenience that each bulb 4a emits unparallel and useless lights 7 as indicated by dotted lines in FIG. 10b. These lights 7, not corresponding to the condition of diffraction of the hologram 3, are not diffracted thereby.

Figure 11A:
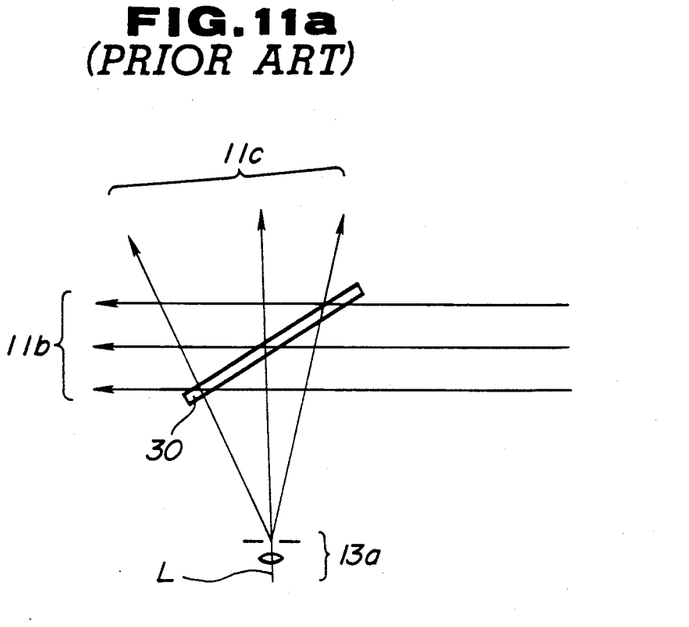
FIG. 11a is a view similar to FIG. 10a, illustrating another known exposure system using a diffused laser beam.
Figure 11B:
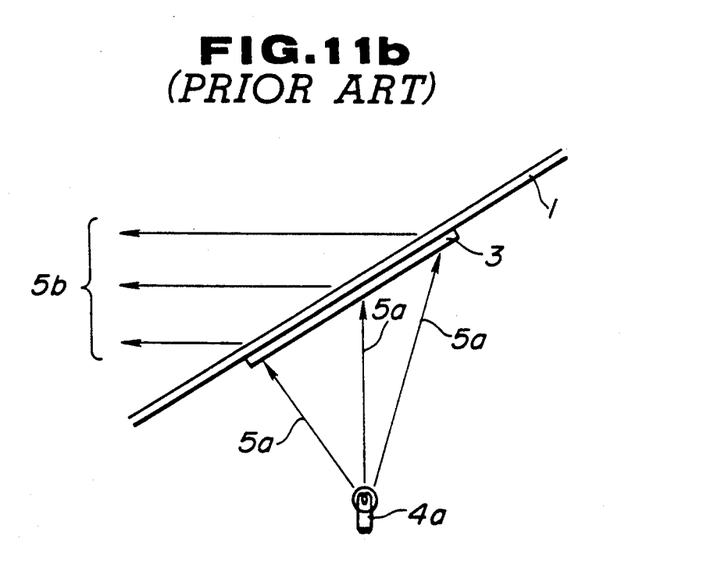
FIG. 11b is a view similar to FIG. 10b, illustrating the operation upon mounting when the hologram receives incident lights from a point light source.

On the other hand, for avoiding the aforementioned inconveniences, an exposure system using a divergent laser beam as shown in FIG. 11a can be used. In this exposure system, a divergent laser beam 11c corresponds to the incident lights 5a from the light source upon mounting. The unexposed hologram 30 is exposed to the divergent laser beam 11c and the parallel laser beam 11b, and, upon mounting, a single bulb 4a serves as the light source as shown in FIG. 11b. In that event, there arises another inconvenience that the quantity of light is not sufficient due to the use of only one bulb 4a.

In order to compensate for the insufficient quantity of light, the bulb 4a may be enlarged in size. This is not possible without limit, however. Additionally, when such point light source or bulb 4a is used, it is necessary to adjust a position of the laser beam source upon exposure to same of the point light source upon reconstruction, requiring a mounting accuracy of the point light source or bulb 4a, resulting in a difficulty of mounting operation thereof.

SUMMARY OF THE INVENTION

It is, therefore, an object of the present invention to provide a lamp arrangement for a motor vehicle which is capable of efficiently diffracting an incident light from a light source, and easily applying to the motor vehicle without enlarging a size of a light source apparatus.

There is provided, according to the present invention, a lamp arrangement for a motor vehicle, the motor vehicle having a rear shelf panel and a rear window, comprising:

a light source arranged in the rear shelf panel for emitting lights in different directions, said light source having a predetermined area; and a transmission hologram mounted on the rear window, wherein said transmission hologram includes a plurality of divisions, said plurality of divisions having different diffraction characteristics from each other to diffract different incident lights from said light source in a predetermined direction.

BRIEF DESCRIPTION OF THE DRAWINGS

FIG. 6b is an enlarged fragmentary view illustrating a point A of FIG. 6a;

FIG. 7b is a view similar to FIG. 6b, illustrating a point B of FIG. 7a;

DETAILED DESCRIPTION OF THE INVENTION

Referring to the accompanying drawings, a preferred embodiment of a lamp arrangement for a motor vehicle according to the present invention will be described. It is to be noted that the same reference numeral is given to the same element as described in connection with FIGS. 8-11b.

Figure 1:
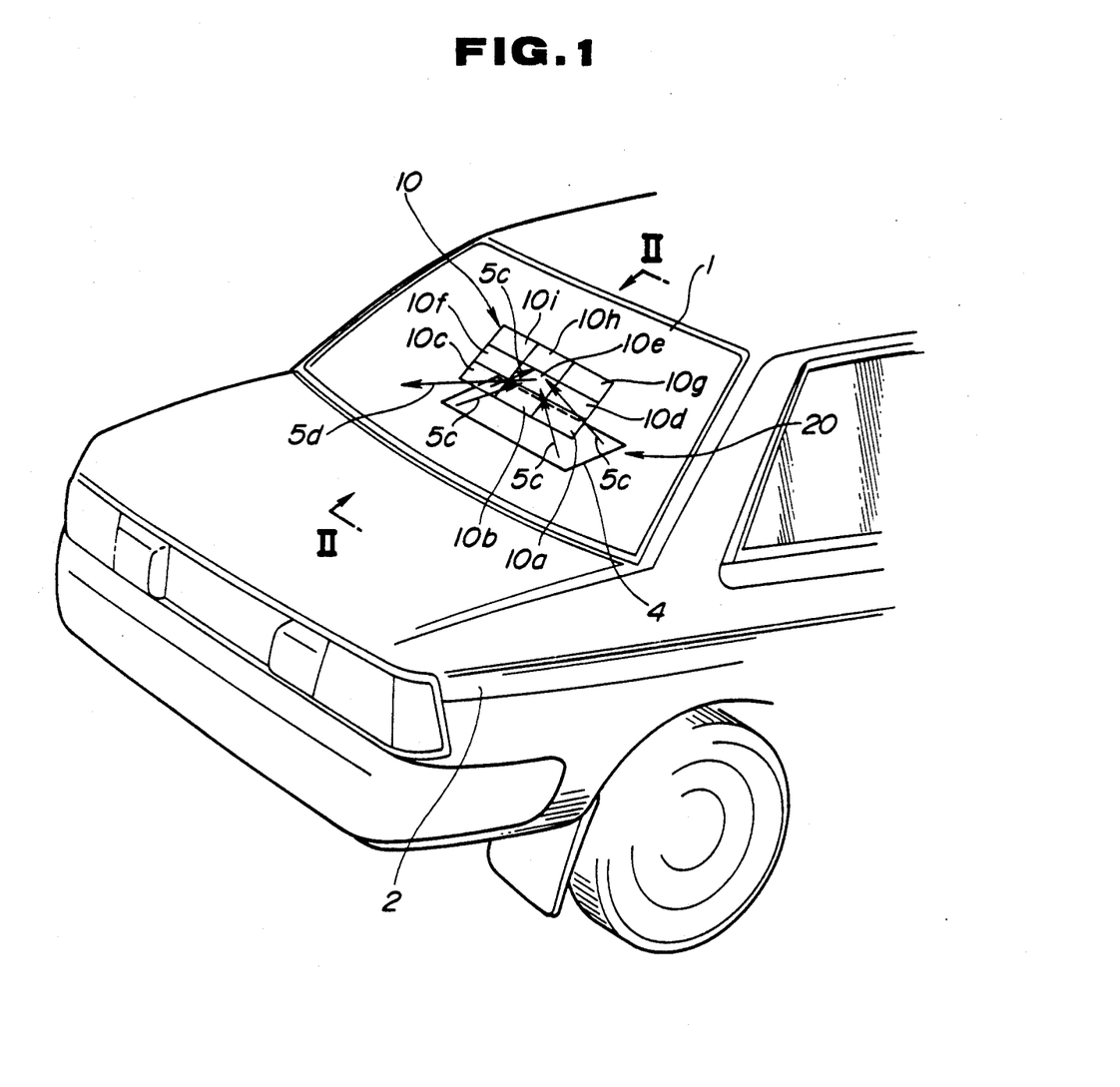
FIG. 1 is a perspective view of a motor vehicle to which a preferred embodiment of a lamp arrangement for a motor vehicle according to the present invention is applied.
Figure 2:
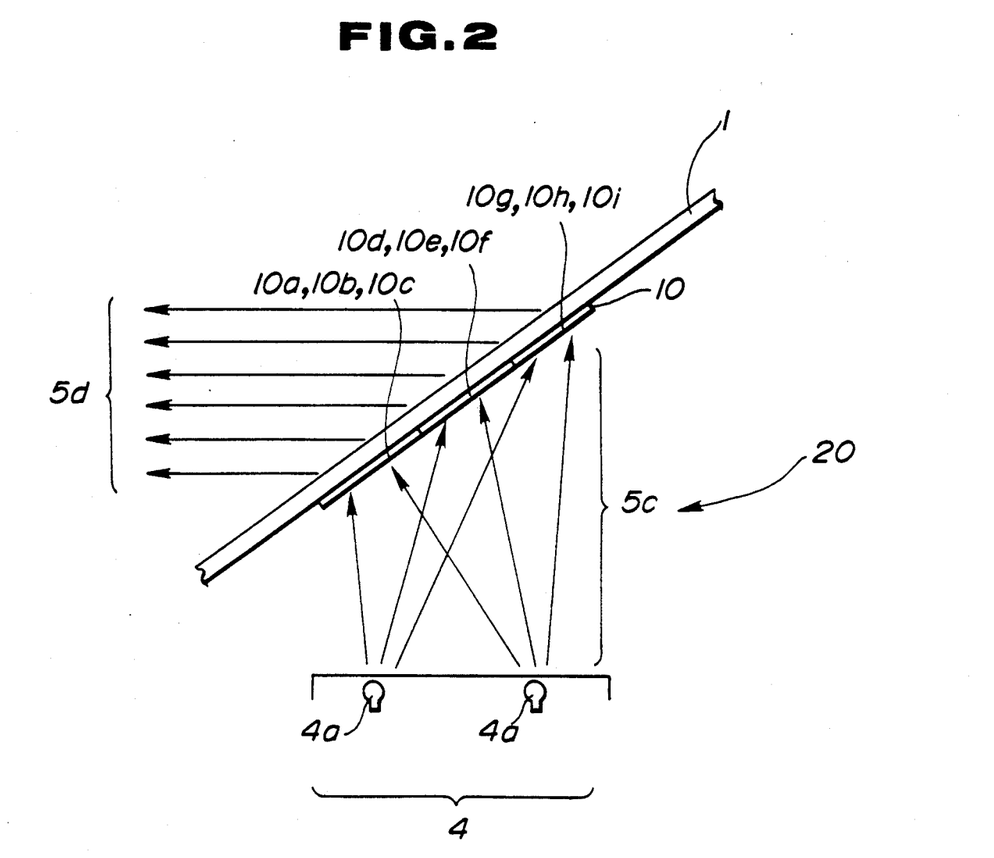
FIG. 2 is a fragmentary sectional view taken along the line II—II of FIG. 1.

Referring to FIG. 1, a reference numeral 20 designates a lamp arrangement for a motor vehicle 20 which serves as a high mounted stop lamp to be lighted when a brake switch 21 (not shown) is turned on. This lamp arrangement 20 includes a transmission hologram 10 which is mounted on a rear window 1 of a motor vehicle 2, and a light source 4 which is built in a rear shelf panel (not shown) located at the rear of a rear seat in a cabin. Referring also to FIG. 2, lights 5c as emerged from the light source 4 are diffracted by the hologram 10 rearward of the vehicle 2, obtaining diffracted lights 5d. In that manner, the lamp arrangement 20 functions as a high mounted stop lamp.

Referring to FIG. 2, the light source 4 includes a plurality of bulbs 4a. However, since a lens system is not arranged to each bulb 4a to obtain parallel lights, each bulb 4a emits the lights 5c in different directions. Under these conditions, the light source 4 is considered to form a surface light source as a whole.

Referring again to FIG. 1, in this embodiment, the hologram 10 includes nine divisions 10a–10i which are obtained by separately exposing the corresponding divisions of a unexposed hologram 100 as will be described hereinafter, and have different diffraction characteristics.

Figure 3A:
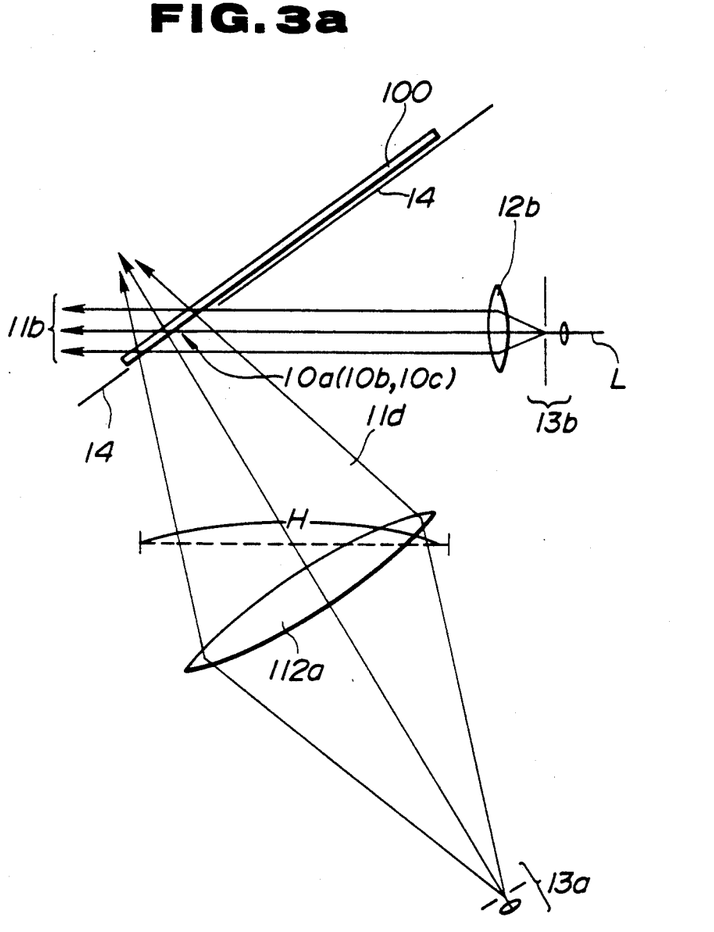
FIG. 3a is a schematic view when exposing divisions 10a, 10b, and 10c of a unexposed hologram.
Figure 3B:
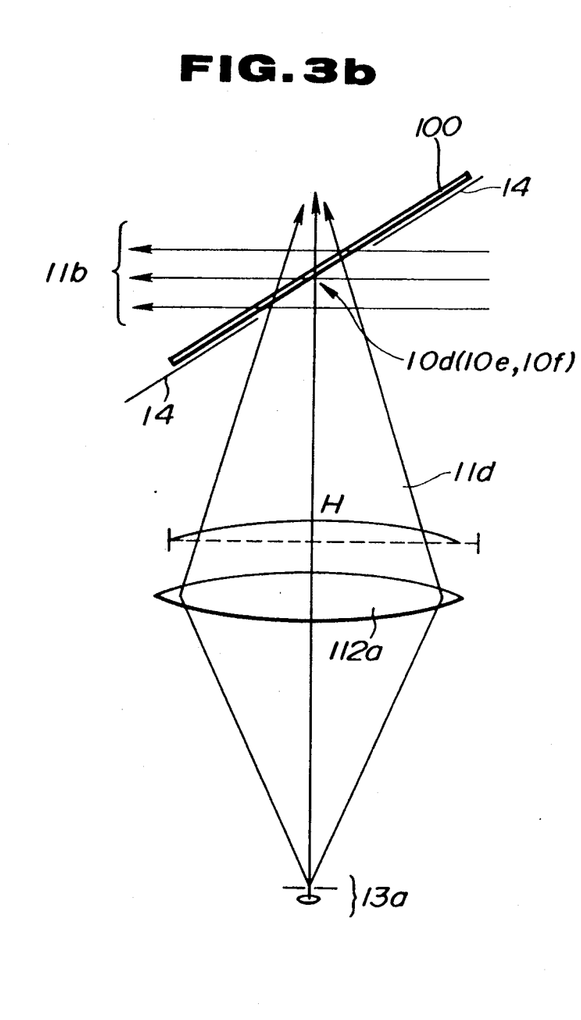
FIG. 3b is a view similar to FIG. 3a, when exposing divisions 10d, 10e, and 10f of the unexposed hologram.
Figure 3C:
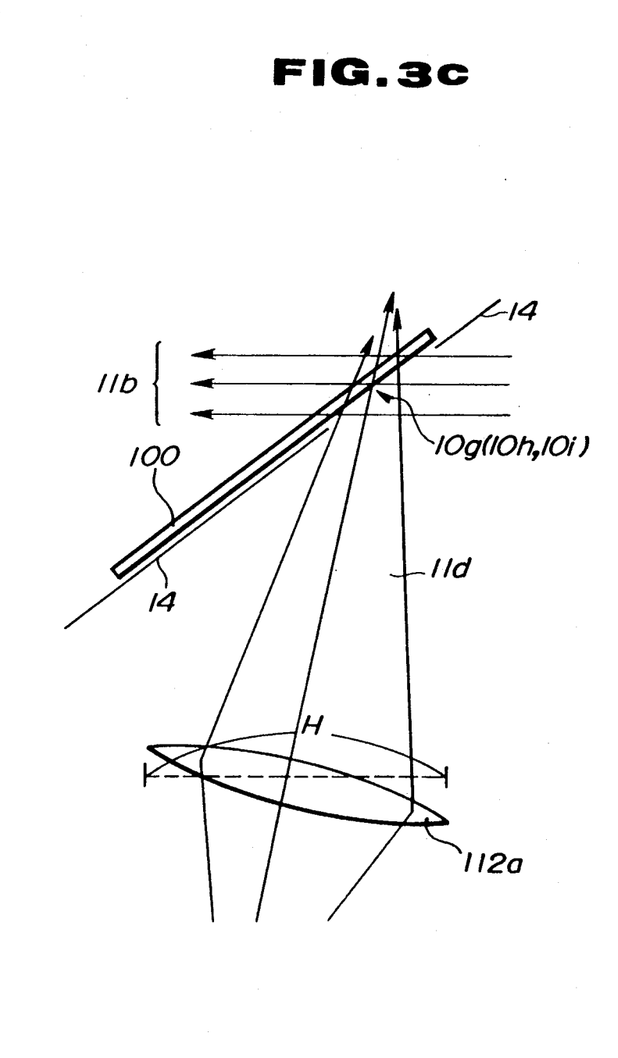
FIG. 3c is a view similar to FIG. 3b, when exposing divisions 10g, 10h, and 10i of the unexposed hologram.

Referring to FIGS. 3a-3c, an exposure system for exposing the divisions 10a-10i of the unexposed hologram 100 will be described.

FIG. 3a shows a case where the division 10a, 10b or 10c is exposed; FIG. 3b shows a case where the division 10d, 10e or 10f is exposed; and FIG. 3c shows a case where the division 10g, 10h or 10i is exposed.

Referring to FIG. 3a, when exposing the division 10a, for example, the unexposed hologram 100 is covered with a mask 14 except the division 10a. Then, from a direction of the light source 4 upon mounting, the division 10a is irradiated with a convergent laser beam 11d through a spatial filter 13a and a converging lens 112a. On the other hand, from a direction parallel to the diffracted lights 5d, the division 10a is irradiated with a parallel laser beam 11b through a spatial filter 13b and a collimating lens 12b in a similar manner in FIG. 9.

Similarly, when exposing the division 10b (or 10c), the unexposed hologram 100 is covered with the mask 14 except the division 10b (or 10c). Then, from the direction of the light source 4 upon mounting, the division 10b (or 10c) is irradiated with the convergent laser beam 11d through the spatial filter 13a and the converging lens 112a. On the other hand, from the direction parallel to the diffracted lights 5d, the division 10b (or 10c) is irradiated with the parallel laser beam 11b through the spatial filter 13b and the collimating lens 12b in a similar manner in FIG. 9.

Referring to FIGS. 3b and 3c, when exposing the division 10d, 10e or 10f, and the division 10g, 10h or 10i, the method of exposure is substantially identical to same when exposing the division 10a, 10b or 10c.

It is to be noted that the divisions 10a-10i may not separately be exposed, but may collectively be exposed. That is, the divisions 10a, 10b, and 10c may be exposed en block, for example.

As described hereinbefore, the light source 4 is considered to form a surface light source as a whole. Thus, at a surface of the converging lens 112a, a diameter H of the convergent laser beam 11d is so established as to be substantially identical to a width of the light source 4 in a longitudinal direction of the vehicle 2.

Figure 4:
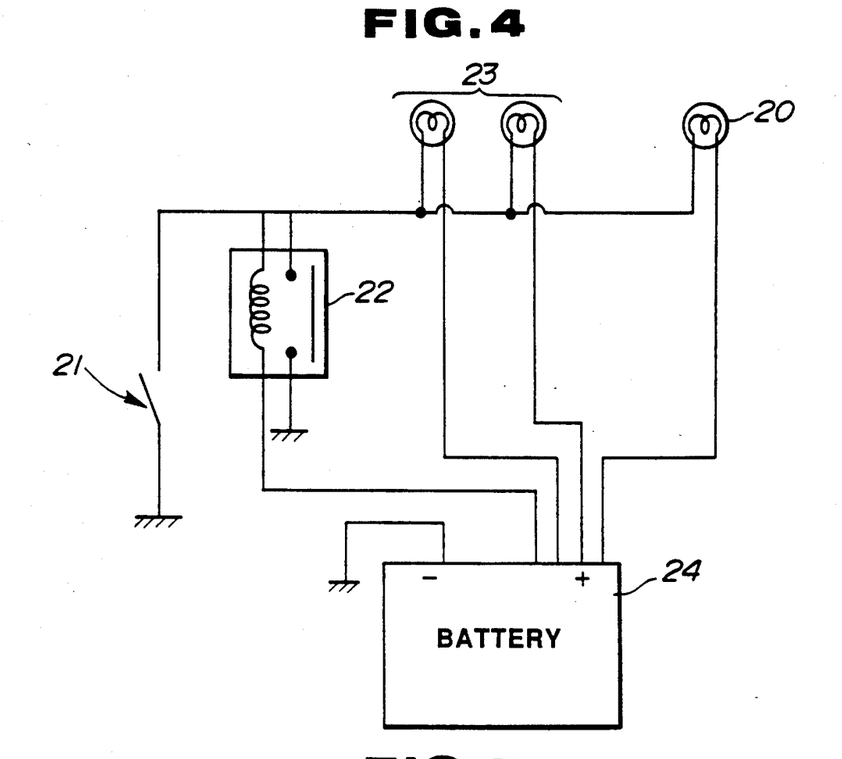
FIG. 4 is a lighting circuit diagram for the preferred embodiment of a lamp arrangement for a motor vehicle.

Referring to FIG. 4, there is shown a lighting circuit for a lamp arrangement for a motor vehicle 20 or high mounted stop lamp. When the brake switch 21 is ON, a relay 22 is turned on. And, with an ordinary brake lamp 23, the lamp arrangement 20 is turned on. In FIG. 4, a reference numeral 24 designates a battery.

Next, the operation of this embodiment will be described.

Figure 5:
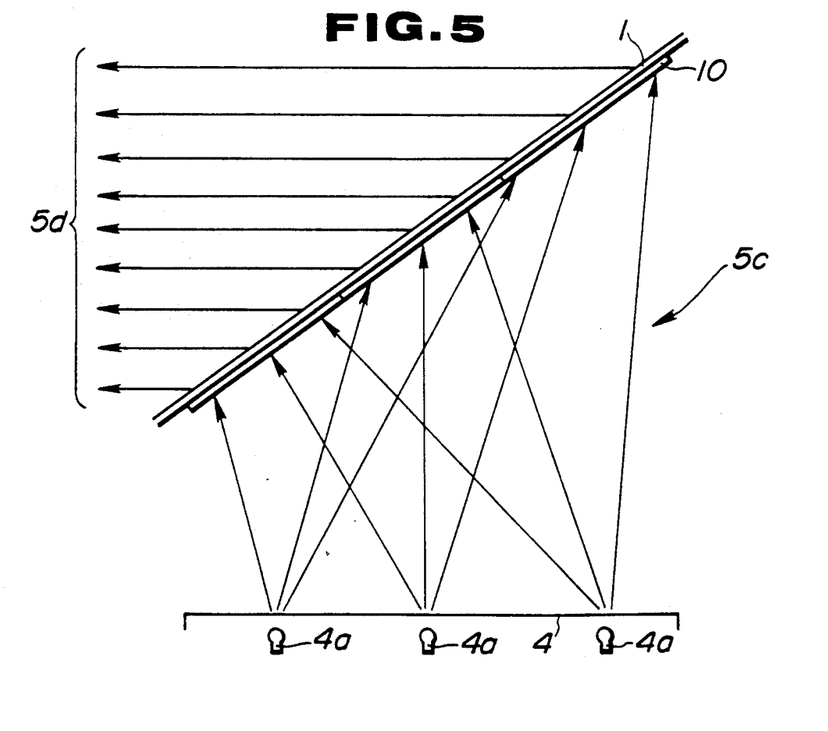
FIG. 5 is a view similar to FIG. 2, illustrating the operation of the preferred embodiment of a lamp arrangement for a motor vehicle.

As described above in connection with FIGS. 3a-3c, each of the divisions 10a-10i of the unexposed hologram 100 is exposed to the convergent laser beam 11d from the direction of the light source 4 upon mounting, thus obtaining the hologram 10. Accordingly, each of the divisions 10a-10i of the hologram 10 satisfies the condition of diffraction relative to the incident lights 5c from the light source 4. As a result, almost all the incident lights 5c from the light source 4 are diffracted by any of the divisions 10a-10i as shown in FIG. 5. If consideration is made on the side of the light source 4, the lights as emerged from any point of the light source 4 are diffracted when falling on the hologram 10.

This results in increase in utilization efficiency of light and brightness of display without increasing the size of the light source 4 and a current passing therethrough.

Referring to FIGS. 6a-7b, a description will be made with regard to a difference between a case where the unexposed hologram 100 with a plurality of divisions is exposed as described above, and same where the unexposed hologram 100 is exposed as a single unit, i.e. without being divided into divisions.

Figure 6A:
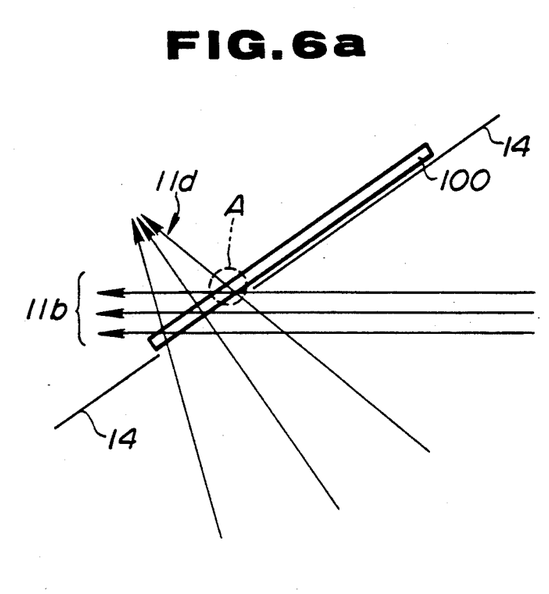
FIG. 6a is a view similar to FIG. 3c, illustrating a case where the unexposed hologram with divisions is exposed.
Figure 6B:
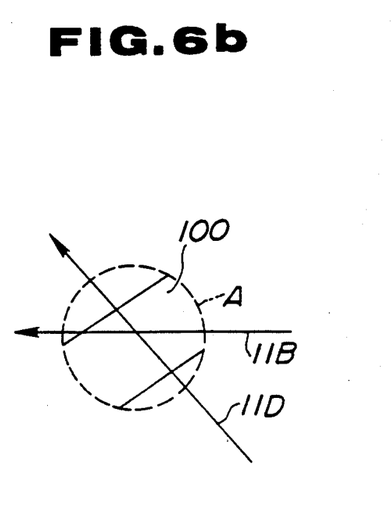

Referring to FIG. 6a, there is shown a case where the unexposed hologram 100 with divisions is exposed. By way of example, an exposure state of the unexposed hologram 100 at a point A of FIG. 6a will be considered. Referring to FIG. 6b, since the unexposed hologram 100 is exposed to only two laser lights 11D and 11B, a single diffraction grating will be formed at the point A. Accordingly, upon mounting, the incident lights 5c from the light source 4 are diffracted efficiently by the single diffraction grating in a direction with a predetermined angle of diffraction.

Figure 7A:
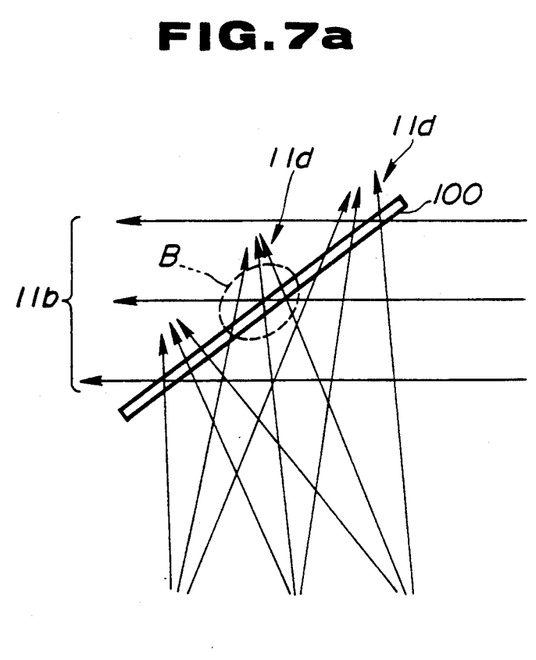
FIG. 7a is a view similar to FIG. 6a, illustrating a case where the unexposed hologram without divisions is exposed.
Figure 7B:
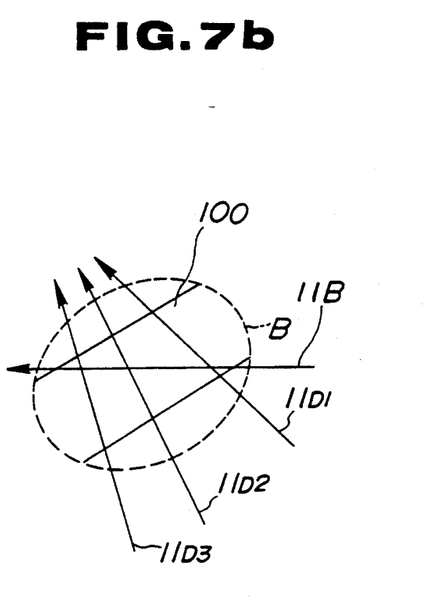

Referring to FIG. 7a, there is shown a case where the unexposed hologram 100 without divisions is exposed. By way of example, an exposure state of the unexposed hologram 100 at a point B of FIG. 7a will be considered. Referring to FIG. 7b, since a plurality of laser lights $11D_1$, $11D_2$, and $11D_3$ which have different incidence angles from each other come from a direction of the light source 4 upon mounting, the number of diffraction gratings to be formed in the unexposed hologram 100 will be increased. Accordingly, diffraction efficiency at the point B is deteriorated in accordance with an increase in number of the diffraction gratings formed, resulting in a decrease in brightness of display.

In this embodiment, the unexposed hologram 100 is divided into the divisions 10a–10i, and separately exposed to the convergent laser beam 11d from the direction of the light source 4 upon mounting, thus obtaining the hologram 10. As a result, the hologram 10 can diffract almost all the incident lights 5c from the light source 4, resulting in the effective use of lights emerged from the light source 4, and an increase in the quantity of light of the lamp arrangement 20, with decreased power of the light source 4.

The wave length and incidence angle of the laser light for use of exposure and same of the light for use of reconstruction or display may not necessarily be identical, but may be changeable on condition that the Bragg condition is satisfied.

What is claimed is:

1. A lamp arrangement for a motor vehicle, the motor vehicle having a rear shelf panel and a rear window, comprising:
    a surface light source arranged in the rear shelf panel, said surface light source including a plurality of laterally spaced light sources, each emitting divergent light; and
    a transmission hologram placed on the rear window, wherein said transmission hologram includes a plurality of divisions, said plurality of divisions each having a different diffraction characteristic, said plurality of divisions being disposed on one plane, respectively, each of said plurality of divisions receiving light from each of said plurality of light sources.

2. A lamp arrangement for a motor vehicle having a rear window, comprising:
    a transmission hologram mounted on the rear window;
    a surface light source mounted within the motor vehicle, said surface light source including a plurality of spaced light sources, each emitting divergent light toward said transmission hologram; and
    said transmission hologram being divided into a plurality of divisions with individual holograms which were exposed to a convergent laser beam from a direction in which said surface light source is arranged after its mounting on the rear window.

3. A lamp arrangement for a motor vehicle having a rear window, comprising:
    a transmission hologram mounted on the rear window; and
    a surface light source mounted within the motor vehicle, said surface light source including a plurality of light sources, each emitting divergent light toward said transmission hologram,
    said transmission hologram including a plurality of divisions with individual holograms, each of said plurality of divisions receiving divergent light from each of said plurality of light sources.

4. A lamp arrangement for a motor vehicle having a rear window, comprising:
    a transmission hologram mounted on the rear window; and
    a surface light source mounted within the motor vehicle, said surface light source including a plurality of spaced light sources, each emitting divergent light toward said transmission hologram,
    said transmission hologram including a plurality of divisions with individual holograms, each of said plurality of divisions receiving divergent light from said surface light source.

5. A lamp arrangement for a motor vehicle having a rear window, comprising:
    a transmission hologram mounted on the rear window; and
    a surface light source mounted within the motor vehicle, said surface light source including a plurality of spaced light sources, each emitting divergent light toward said transmission hologram,
    said transmission hologram being divided into and consisting of a plurality of divisions with individual holograms, each of said plurality of divisions receiving divergent light from said surface light source.

* * * * *